J. B. JARMIN.
ROAD MACHINE.
APPLICATION FILED OCT. 22, 1917.
1,296,807.
Patented Mar. 11, 1919.
2 SHEETS—SHEET 1.
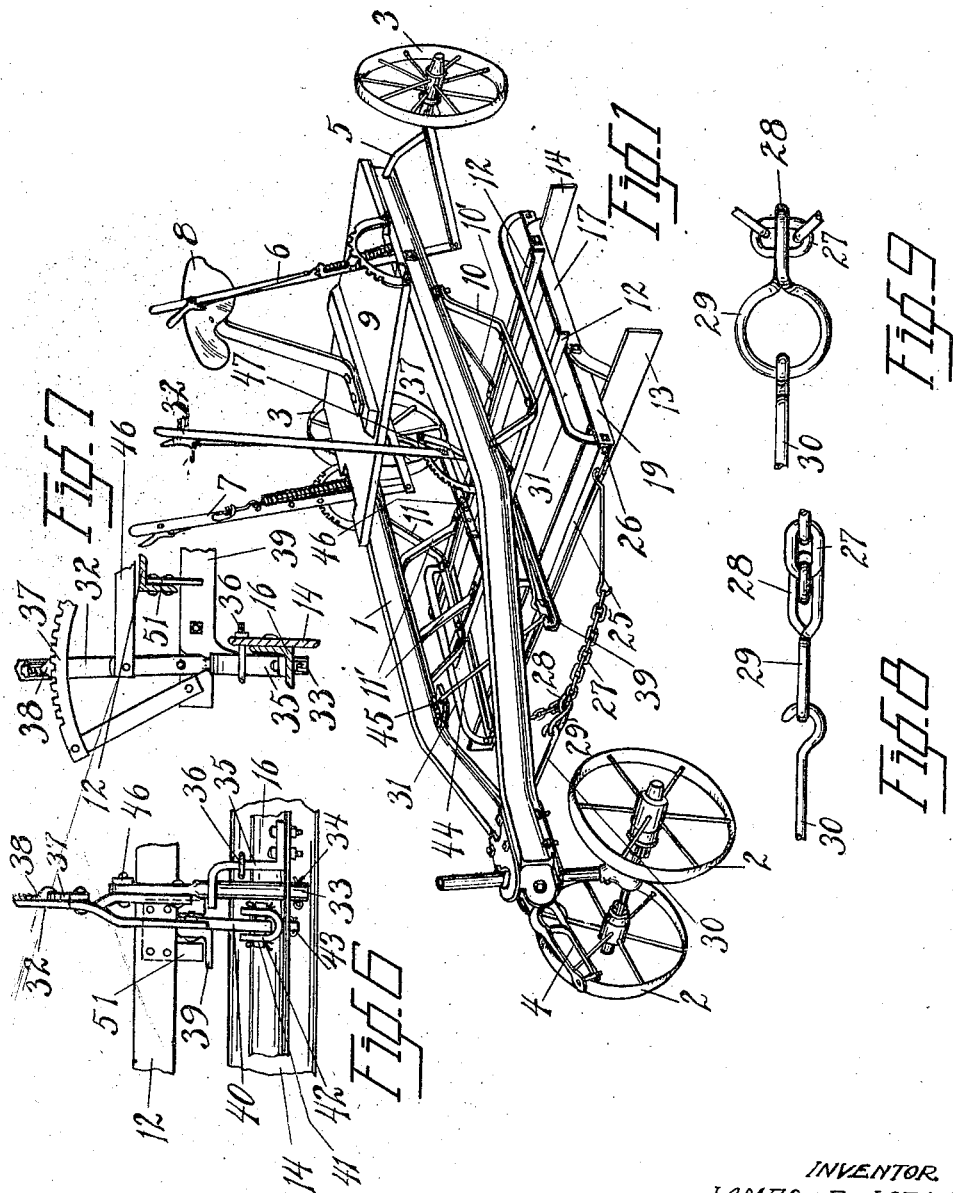
INVENTOR.
JAMES B. JARMIN
BY
Herbert E. Smith
ATTORNEY

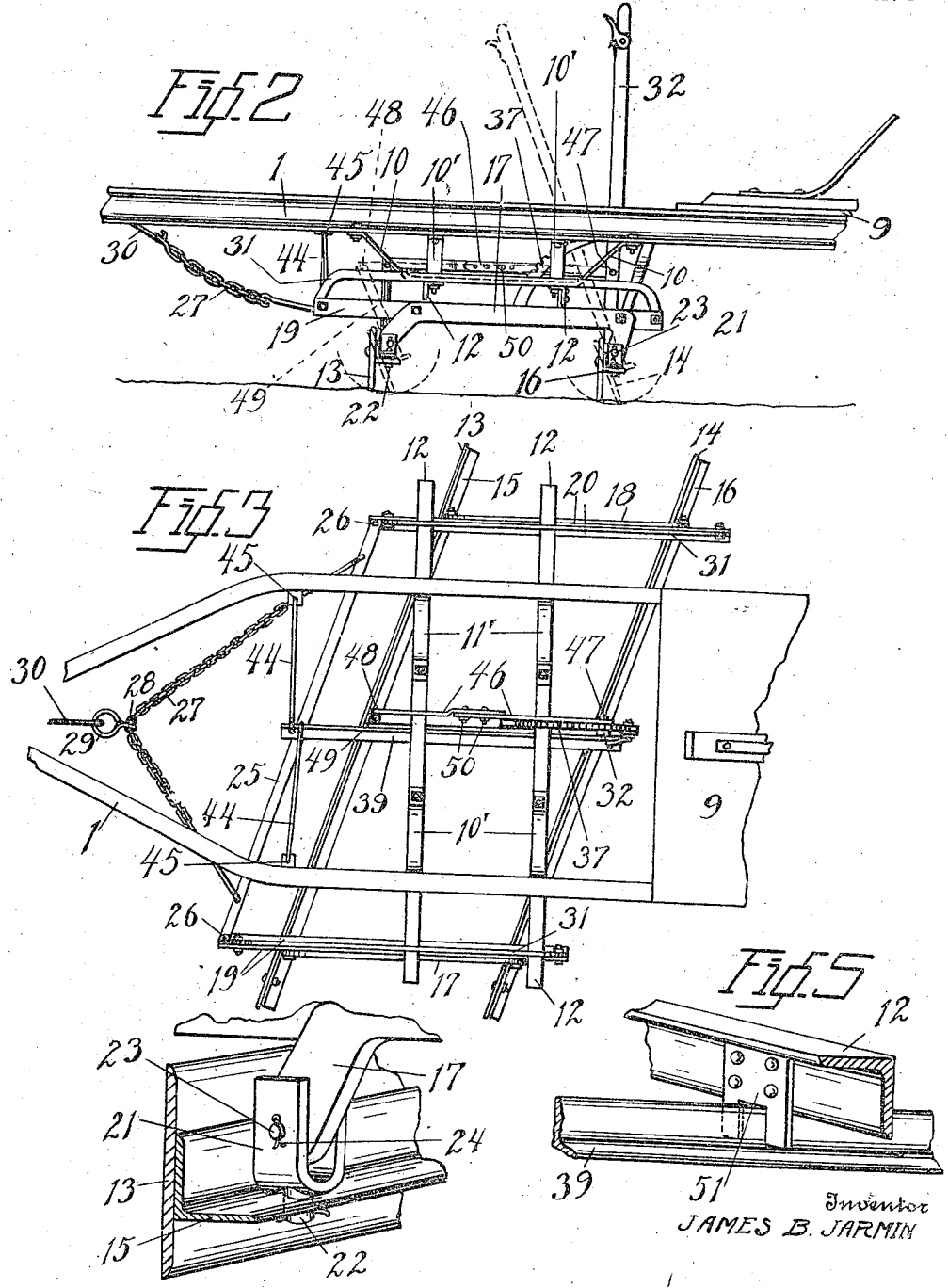

UNITED STATES PATENT OFFICE.

JAMES B. JARMIN, OF SPOKANE, WASHINGTON.

ROAD-MACHINE.

1,296,807.

Specification of Letters Patent.   Patented Mar. 11, 1919.

Application filed October 22, 1917.   Serial No. 197,875.

*To all whom it may concern:*

Be it known that I, JAMES B. JARMIN, a citizen of the United States, residing at Spokane, in the county of Spokane and State of Washington, have invented certain new and useful Improvements in Road-Machines, of which the following is a specification.

The present invention relates to improvements in road machines under the broad class of wheeled scrapers and is designed particularly for use in grading, leveling, and scraping, and otherwise fixing and repairing roads and highways.

The primary object of the invention is the provision of an implement of this character which is simple in construction and economical in operation, and is durable, and reliable in performing the functions for which it is intended.

The invention consists in certain novelties of construction and combinations of parts as will be hereinafter more fully described and claimed.

In the accompanying drawings I have illustrated one complete example of the physical embodiment of my invention, constructed according to the best mode I have so far devised for the practical application of the principles of my invention. The implement as depicted and described herein has been successfully and satisfactorily operated in actual use.

In the drawings:

Figure 1 is a perspective view of an implement built according to and embodying the novel features of my invention.

Fig. 2 is a side elevation of the grading or scraper blades with their connections.

Fig. 3 is a top plan view of the parts shown in Fig. 2.

Fig. 4 is an enlarged detail view showing one of the swiveled clevises for the scraper blades.

Fig. 5 is a detail view showing the connection at the center of the implement, between the blade tilting bar and one of the transverse bars of the suspending frame for the scrapers.

Fig. 6 is a detail view showing the operating lever and connections for tilting the scraper blades and showing also its pivotal connection with the blades.

Fig. 7 is a view of the parts in Fig. 6 as seen from the left in Fig. 6.

Fig. 8 is a detail edge view of the draft attachment for the scraper blades, and Fig. 9 is a top plan view of the parts in Fig. 8.

In the preferred embodiment of the invention as illustrated in the drawings, I have illustrated a comparatively long metallic frame 1, of channel irons, and supported on the two wheels 2 2 forming a front adjustable truck, and the wheels 3 3 forming the rear truck of the implement. The machine may be drawn by attaching horses to the clevis 4 on the front truck, and the rear axle is arched, or made in the shape of a crank axle 5 for the wheels 3 3, and is journaled in the frame 1 so that the frame may be elevated or depressed at either or both sides of the machine by utilization of the respective levers 6 and 7. By employing these levers the frame may be moved so that the operating parts of the implement are entirely free of the ground, or they may be adjusted to desired position for use, as readily understood.

The driver or operator may occupy the seat 8 on the platform 9 at the rear of the frame 1, and it will be apparent that the driver has free access to the conveniently located operating levers of the implement.

Below each of the two parallel longitudinal side bars of the main frame, and forward of the rear wheels, is fixed a strut as 10 and 11, each lying below and in a plane parallel with its frame bar, and spaced therefrom as shown. These struts, together with a pair of transverse angle iron bars 12 12 bolted thereto, and the transverse inclined braces 10′ 11′ extending from the side bars of the main frame to the transverse bars, form a suspending frame for the scraper frame and its scrapers or blades. The free ends of the parallel bars 12 12 as seen in the drawings project beyond the main frame of the implement, and are maintained at all times in fixed angular relation thereto.

The scraper or grader blades are flat metal plates as 13, 14, and these plates are reinforced by angle iron bars 15 and 16 respectively. The blades are pivoted so that they are capable of being tilted forwardly or rearwardly with relation to the perpendicular, and to accomplish this purpose a pair of arched side bars 17 and 18 are employed, one at each side of the frame, and these bars are fastened securely to the longitudinal bars 19 and 20 of the scraper frame.

In Fig. 4 one of the four pivotal joints for the scraper blades is illustrated, and as all four joints are alike, a description of one will suffice for all. The blade and arched bar, in each case, are coupled together by a swiveled clevis 21 having a stem 22 passing through a perforation in the angle bar which reinforces the blade, and it will be readily seen that the blade may be swiveled or swung on the stem as a pivot. The end of the arch bar is perforated, transversely and has a pin 23 passed through the perforation and through the perforated ears of the clevis, a cotter pin 24 being employed to retain the pivot pin against loss by displacement. Thus it will be seen that the scraper blade, by its pivotal connection through the perforated clevis and perforated arch bar, may be tilted with its lower edge toward the front to more readily shear off the surface of the ground, and when the blade is tilted with its lower edge to the rear it is in position to act in the nature of a drag to ride over and level or smooth off the loose material.

In addition to their adjustment with relation to the perpendicular, the blades may be adjusted horizontally, at different angles to the longitudinal axis of the implement, or oblique to the direction of travel of the machine, on their swivel stems, and held in adjusted position by the following devices. For this purpose the angle irons 19 and 20 are connected at their forward ends by the flat metal draw bar 25, arranged transversely of the implement and pivoted at 26 26 to the ends of these longitudinal bars 19 and 20. A chain 27 is attached near the ends of the draw bar, and the links of the chain are passed through an eye 28 of the large loop or ring 29, and the ring 29 is caught over the hook 30 which hook is attached between the converging front ends of the side bars of the main frame 1. When it is designed to adjust the blades obliquely, as in position in Fig. 3, the chain 27 is slipped through the eye 28 until the proper degree of angularity is reached, and then the link of the chain which is lying flat in the loop, has at its sides a pair of vertically disposed links, as in Figs. 8 and 9, so that these side links prevent displacement of the flat link with consequent displacement of the scrapers, by holding the flat link locked in the loop. When the blades, and their supporting frame, are adjusted obliquely, the frame is slidably supported on the two transverse bars 12 12 by means of the two slide rods 31 which are attached to, spaced above, and parallel with, the two longitudinal frame bars 19 and 20 of the scraper blade frame. In Figs. 1 and 2 it will be apparent that the two transverse bars 12 12 project through the space between the longitudinal rods and longitudinal bars, which latter in effect form a slot, which permits of the oblique adjustment of the scrapers and frame, and the longitudinal rods suspend the frame of the scrapers on the transverse bars.

The scraper blades are tilted through the instrumentality of the tilting lever 32, located just in front of the driver's seat and formed at 33 with a shank or stem that is rotatably supported in the angle iron bar 16 on the rear scraper blade, which is perforated to receive the shank, and a cotter pin 34 in the shank prevents withdrawal of the shank. An additional support for the stem is provided by the perforated bracket 35 bolted or riveted to the angle bar, and this bracket is further supported by a U-bolt 36 passed through the scraper blade 14. The lever has a toothed segmental rack 37 and pawl 38 as usual, the rack being fixed on a central, longitudinal link in the form of an angle bar 39 provided with curved end extension 40 which is perforated and pivoted between the perforated ears of the swiveled clevis 42 whose stem 43 is swiveled in a perforation in the angle iron bar 16 of the rear scraper blade. At its forward end this link has a pair of outwardly extending pivoted rods 44, 44, that are also pivoted at their outer ends 45 to the main frame of the implement.

The forward blade may be tilted in unison with the rear blade by employment of the extensible operating bar 46 which is pivoted at 47 to the operating lever, and through pivotal connection at 48 with the arm 49 fixed on the front blade, so that the two blades are tilted in unison. By means of the extensible operating bar 46 which has overlapping, perforated adjoining ends so that the length of the bar may be varied and the bar held in adjusted position by means of bolts 50 50, one bar may be tilted more than the other, if desired, as will be understood.

The central longitudinal link is instrumental in holding the scraper frame members, which extend longitudinally of the implement, in parallelism with the main frame, and in parallelism with themselves, and it also is instrumental in holding the two scrapers in alinement so that they will travel in the same path. To accomplish this end the rear transverse suspending bar 12 is provided with a depending, bifurcated bracket 51, midway its length and this bracket straddles the link 39, as best seen in Figs. 5 and 6 and 7. Thus the link is freely suspended at the front by its side rods 44 44 and is pivoted and swiveled at its rear end to the rear blade, and is held in a straight longitudinal line by the bifurcated bracket on the transverse bar 12 and the rods 44 44. The central longitudinal link thus insures a forward travel of the scrapers in the identical same path, regardless of the angle at which the scraper blades have been adujsted. While the scraper blades and frame are freely movable in a horizontal plane, for adjusting the scrapers obliquely to the travel of the machine, it will readily be apparent that vertical movement of the scrapers and their frame is prevented by the interposition of the transverse suspending bars 12 12 between the longitudinal side bars and the longitudinal rods of the scraper frame. Thus, when moving over a hollow place the blades cannot fall therein, but will permit the soil to fall and will then level it off as the blade passes over the surface, and when passing over irregular high places and bumps, the entire weight of the implement holds the scraper blades to their work and causes them to scrape off excess material. The altitude of the blades, as before stated is governed by the two levers 6 and 7, and it will readily be seen that when it is desired to tilt the machine and blades horizontally as for instance for the purpose of depositing dirt in the center of the road, or before it passes over the ends of the blades, by proper manipulation of these levers the required side of the blades may be lifted.

Although the implement illustrated has proven highly successful in actual practice, it will be understood that I contemplate changes, additions, and alterations in the construction and operation of the machine, within the scope of my claims, without departing from the spirit of my invention.

What I claim is:—

1. The combination in a wheeled scraper with its main frame including fixed laterally projecting transverse bars, of a longitudinally slidable scraper frame including longitudinal bars below the projecting transverse bars and longitudinal rods above the transverse bars, scrapers supported from the longitudinal bars, a draft bar connecting the longitudinal bars, and an adjustable draft chain connecting said draft bar to the main frame.

2. The combination in a wheeled scraper with its main frame including fixed transverse bars, of a longitudinally slidable scraper frame including longitudinal bars below the transverse bars and longitudinal rods above the transverse bars, arched bars attached to said longitudinal bars and scrapers supported from said arched bars, a draft bar pivotally connecting the longitudinal bars, and an adjustable draft chain connecting said draft bar to the main frame.

3. The combination in a wheeled scraper with its main frame including fixed transverse bars, of a longitudinally slidable scraper frame including longitudinal bars below the transverse bars and supporting rods above the transverse bars, arched bars attached to said longitudinal bars, scraper blades tiltably supported from said arched bars and means for tilting the blades, a draft bar pivotally connecting the longitudinal bars, and an adjustable draft medium connecting the draft bar with the main frame.

4. The combination with a scraper frame including a pair of arched longitudinal bars, of a pair of obliquely adjustable, transverse scrapers each having vertical and horizontal pivot supports from said bars, and means for tilting said scrapers on their horizontal axis and holding them in adjusted position.

5. The combination with a scraper frame including a pair of arched longitudinal bars, of a pair of transverse scraper blades, a clevis pivoted at the end of each longitudinal bar, stems on the clevises swiveled in pairs in said scrapers, means for tilting the scraper blade, and means for adjusting the blades on their swiveled connections.

In testimony whereof I affix my signature.

JAMES B. JARMIN.